(12) United States Patent
Kato et al.

(10) Patent No.: US 6,976,478 B2
(45) Date of Patent: Dec. 20, 2005

(54) EVAPORATED FUEL ADSORBING APPARATUS FOR AN ENGINE INTAKE PASSAGE

(75) Inventors: Tetsuya Kato, Okazaki (JP); Hideaki Itakura, Nagoya (JP); Takanobu Kawano, Okazaki (JP); Takashi Nishimoto, Toyota (JP); Kouichi Oda, Chita (JP)

(73) Assignees: Toyota Jidosha Kabushiki Kaisha, Toyota (JP); Nippon Soken, Inc., Nishio (JP); Toyota Boshoku Kabushiki Kaisha, Kariya (JP)

( * ) Notice: Subject to any disclaimer, the term of this patent is extended or adjusted under 35 U.S.C. 154(b) by 0 days.

(21) Appl. No.: 11/006,538

(22) Filed: Dec. 8, 2004

(65) Prior Publication Data
US 2005/0126547 A1  Jun. 16, 2005

(30) Foreign Application Priority Data
Dec. 9, 2003  (JP) .............................. 2003-409998

(51) Int. Cl.[7] .......................................... F02M 55/02
(52) U.S. Cl. ........................................ 123/519; 96/132
(58) Field of Search ............................... 123/518, 519, 123/520, 198 E; 96/134, 144, 154

(56) References Cited

U.S. PATENT DOCUMENTS

| | | | |
|---|---|---|---|
| 3,813,347 A | * 5/1974 | Hayes | ........................ 502/402 |
| 6,699,310 B2 | * 3/2004 | Oda et al. | ...................... 96/132 |
| 2002/0129711 A1 | * 9/2002 | Oda et al. | ...................... 96/134 |
| 2003/0101867 A1 | * 6/2003 | MacDowall et al. | .......... 95/143 |
| 2003/0116021 A1 | * 6/2003 | Oda et al. | ...................... 96/134 |

FOREIGN PATENT DOCUMENTS

| | | |
|---|---|---|
| JP | 05-208110 | 8/1993 |
| JP | 2003-193917 | 7/2003 |

* cited by examiner

*Primary Examiner*—Thomas Moulis
(74) *Attorney, Agent, or Firm*—Kenyon & Kenyon

(57) ABSTRACT

An evaporated fuel adsorbing apparatus for an engine intake passage includes a layer of activated carbon disposed in the engine intake passage for adsorbing evaporated fuel. The activated carbon includes activated carbon pellets having pores. At least one of an average pellet size and an average pore size of the activated carbon is varied in an intake gas flow direction of the engine intake passage. More particularly, an average pore size of a first portion of the activated carbon located in an atmosphere side portion of the layer is greater than an average pore size of a second portion of the activated carbon located in an engine side of the layer. An average pellet size of the first portion of the activated carbon is smaller than an average pellet size of the second portion of the activated carbon.

7 Claims, 4 Drawing Sheets

EVAPORATED FUEL ADSORBING APPARATUS FOR AN ENGINE INTAKE PASSAGE

BACKGROUND OF THE INVENTION

1. Field of the Invention

The present invention relates to an evaporated fuel adsorbing apparatus for an intake passage of an internal combustion engine.

2. Description of Related Art

Recently, a regulation about HC (hydrocarbon) released from a vehicle when it stops has been changed to be severe, and it has become a problem that when a vehicle temporarily stops, a fuel remaining in an engine cylinder and a fuel leaked from a fuel injector are evaporated and are released from the intake passage to an atmosphere.

In order to suppress release of the fuel, Japanese Patent Publication 2003-193917 proposes an evaporated fuel adsorbing apparatus where an evaporated fuel adsorbing apparatus including an activated carbon layer is disposed downstream of an air cleaner filter in an engine intake passage.

However, with the proposed evaporated fuel adsorbing apparatus, there is such a problem that when hydrocarbons of a large C-number (a number of carbon atoms included in an HC molecule is large, for example, greater than eight) contained in the atmosphere reach the activated carbon layer of the evaporated fuel adsorbing apparatus, the evaporated fuel adsorbing apparatus is likely to lose its primary ability of adsorbing the evaporated fuel flowing to the evaporated fuel adsorbing apparatus from an engine side in a relatively short period of time.

SUMMARY OF THE INVENTION

An object of the invention is to provide an evaporated fuel adsorbing apparatus which is unlikely to lose its primary ability of adsorbing an evaporated fuel flowing to the evaporated fuel adsorbing apparatus from an engine side even if hydrocarbons of a large C-number contained in the atmosphere reach the evaporated fuel adsorbing apparatus.

An evaporated fuel adsorbing apparatus according to embodiments of the present invention that achieves the above and other objects is as follows:

(1) An evaporated fuel adsorbing apparatus for an engine intake passage includes a layer of activated carbon disposed in the engine intake passage for adsorbing evaporated fuel. The activated carbon includes activated carbon pellets having pores. At least one of an average pellet size and an average pore size of the activated carbon is varied in an intake gas flow direction of the engine intake passage.

(2) An average pore size of a first portion of the activated carbon located in an atmosphere side portion of the layer is greater than an average pore size of a second portion of the activated carbon located in an engine side portion of the layer.

(3) An average pellet size of a first portion of the activated carbon located in an atmosphere side portion of the layer is smaller than an average pellet size of a second portion of the activated carbon located in an engine side portion of the layer.

(4) An average pore size of a first portion of the activated carbon located in an atmosphere side portion of the layer is greater than an average pore size of a second portion of the activated carbon located in an engine side of the layer, and an average pellet size of the first portion of the activated carbon located in the atmosphere side portion of the layer is smaller than an average pellet size of the second portion of the activated carbon located in the engine side portion of the layer.

(5) The layer of activated carbon includes a first fabric having a plurality of concaves formed therein, pellets of activated carbon inserted in the plurality of concaves of the first fabric, and a second fabric layered to the first fabric from an open side of the plurality of concaves.

(6) The layer of activated carbon includes an activated carbon composite material.

(7) The layer of activated carbon includes a fabric sewing the activated carbon therein.

According to the evaporated fuel adsorbing apparatus in item (1) above, since at least one of an average pellet size and an average pore size of the activated carbon is varied in the intake gas flow direction, it becomes possible to suitably combine a change in a gas passability due to a change in the pellet size and a change in an adsorption feasibility of different C-number hydrocarbons due to a change in the pore size, whereby an ability of adsorbing hydrocarbons of small C-number floating from the engine side is sufficiently retained by the layer of activated carbon even if hydrocarbons of large C-number contained in the intake air from atmosphere are adsorbed by the layer of activated carbon.

According to the evaporated fuel adsorbing apparatus in item (2) above, since an average pore size of a first portion of the activated carbon located in an atmosphere side portion of the layer is greater than an average pore size of a second portion of the activated carbon located in an engine side portion of the layer, almost all portions of the large C-number hydrocarbons contained in the intake air from the atmosphere are selectively adsorbed by the first portion of the activated carbon having the greater pore size, and are unlikely to flow to the second portion of the activated carbon having the smaller pore size located in the engine side portion of the layer. As a result, the second portion of the activated carbon having the smaller pore size located in the engine side portion of the layer is unlikely to be degraded by the large C-number hydrocarbons. Here, a definition of the degradation is that the smaller size pores are blocked by the large C-number hydrocarbons and adsorption of the small C-number hydrocarbons floating from the engine side when a vehicle stops becomes unlikely.

According to the evaporated fuel adsorbing apparatus in item (3) above, since an average pellet size of a first portion of the activated carbon located in an atmosphere side portion of the layer is smaller than an average pellet size of a second portion of the activated carbon located in an engine side portion of the layer, an amount of a large C-number hydrocarbons contained in the intake air from the atmosphere passing through clearances between the activated carbon pellets having the smaller pellet size of the first portion of the activated carbon and reaching the second portion of the activated carbon having the larger pellet size located in the engine side portion of the layer decreases. As a result, the second portion of the activated carbon having the larger pellet size located in the engine side portion of the layer is unlikely to be degraded by the large C-number hydrocarbons.

According to the evaporated fuel adsorbing apparatus in item (4) above, since an average pore size of a first portion of the activated carbon located in an atmosphere side portion of the layer is greater than an average pore size of a second portion of the activated carbon located in an engine side portion of the layer, technical advantages similar to that of the apparatus in item (2) above are obtained. Further, since an average pellet size of a first portion of the activated carbon located in an atmosphere side portion of the layer is smaller than an average pellet size of a second portion of the activated carbon located in an engine side portion of the layer, technical advantages similar to that of the apparatus in item (3) above are obtained.

According to the evaporated fuel adsorbing apparatus in item (5) above, since the layer of activated carbon includes a first nonwoven fabric having a plurality of concaves formed therein, pellets of activated carbon inserted in the plurality of concaves of the first nonwoven fabric, and a second nonwoven fabric layered to the first nonwoven fabric from an open side of the plurality of concaves, respective portions of the activated carbon having respective pellet sizes and pore sizes can be held at respective portions of the nonwoven fabrics. As a result, the above structures in items (2)–(4) are easily obtained.

According to the evaporated fuel adsorbing apparatus in item (6) above, since the layer of activated carbon includes an activated carbon composite nonwoven fabric, respective portions of the activated carbon having respective pore sizes can be held at respective portions of the nonwoven fabric. As a result, the above structures in items (2)–(4) are easily obtained.

According to the evaporated fuel adsorbing apparatus in item (7) above, since the layer of activated carbon includes a nonwoven fabric sewing the activated carbon therein, respective portions of the activated carbon having respective structures can be held at respective portions of the nonwoven fabric. As a result, the above structures in items (2)–(4) are easily obtained.

BRIEF DESCRIPTION OF THE DRAWINGS

The above and other objects, features, and advantages of the present invention will become more apparent and will be more readily appreciated from the following detailed description of the preferred embodiments of the invention taken in conjunction with the accompanying drawings, in which.

DETAILED DESCRIPTION OF THE PREFERRED EMBODIMENTS

An evaporated fuel adsorbing apparatus for an engine intake passage according to the present invention will be explained below with reference to FIGS. 1–8.

Figure 3:
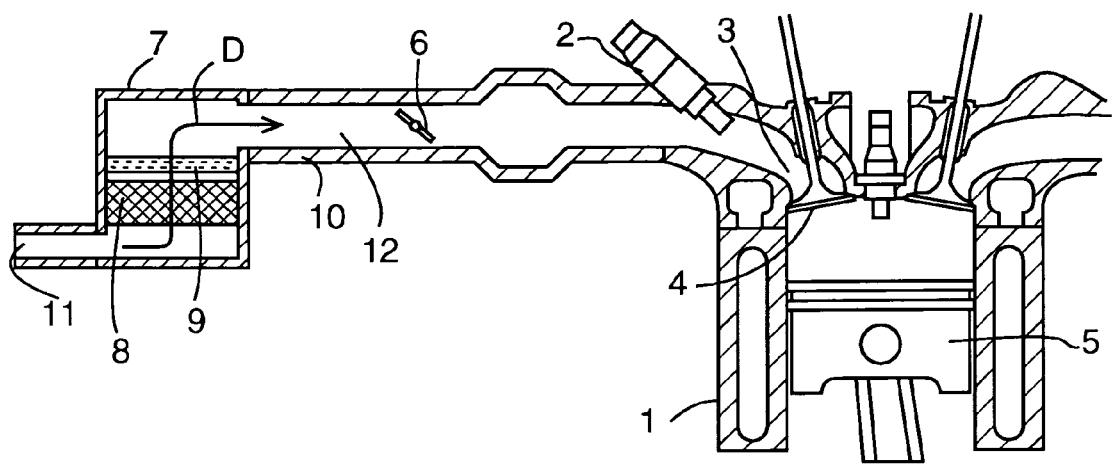
FIG. 3 is a cross-sectional view of an engine intake passage where the evaporated fuel adsorbing apparatus of FIG. 1 is installed.

As illustrated in FIG. 3, the evaporated fuel adsorbing apparatus for an engine intake passage according to the present invention is an apparatus including a layer of activated carbon 9 for adsorbing an evaporated fuel. The layer of activated carbon 9 is disposed in an intake passage 12 of an internal combustion engine 1.

During operation of the engine 1, a fuel (e.g., gasoline) injected from a fuel injector 2 flows into a combustion chamber of the engine through an intake port 3 and an intake valve 4, and a portion of the fuel adheres to the intake port 3, the intake valve 4, and a piston 5. When operation of the engine is stopped, the HC (hydrocarbons) adhering to the intake passage is evaporated and floats and flows through a clearance between a throttle valve 6 and a wall of the intake gas passage toward an air cleaner 7. The air cleaner 7 includes an air filter 8 for filtering the intake air and the layer of activated carbon 9 for catching evaporated fuel. The layer of activated carbon 9 is disposed inside the air cleaner 7 and downstream of the air filter 8 in an intake gas flow direction D. The air cleaner 7 is disposed between the air intake pipe 10 and an air inlet 11. The air intake 11, the air cleaner 7, the intake pipe 10, and the intake port 3 form the engine intake passage 12.

Figure 1:
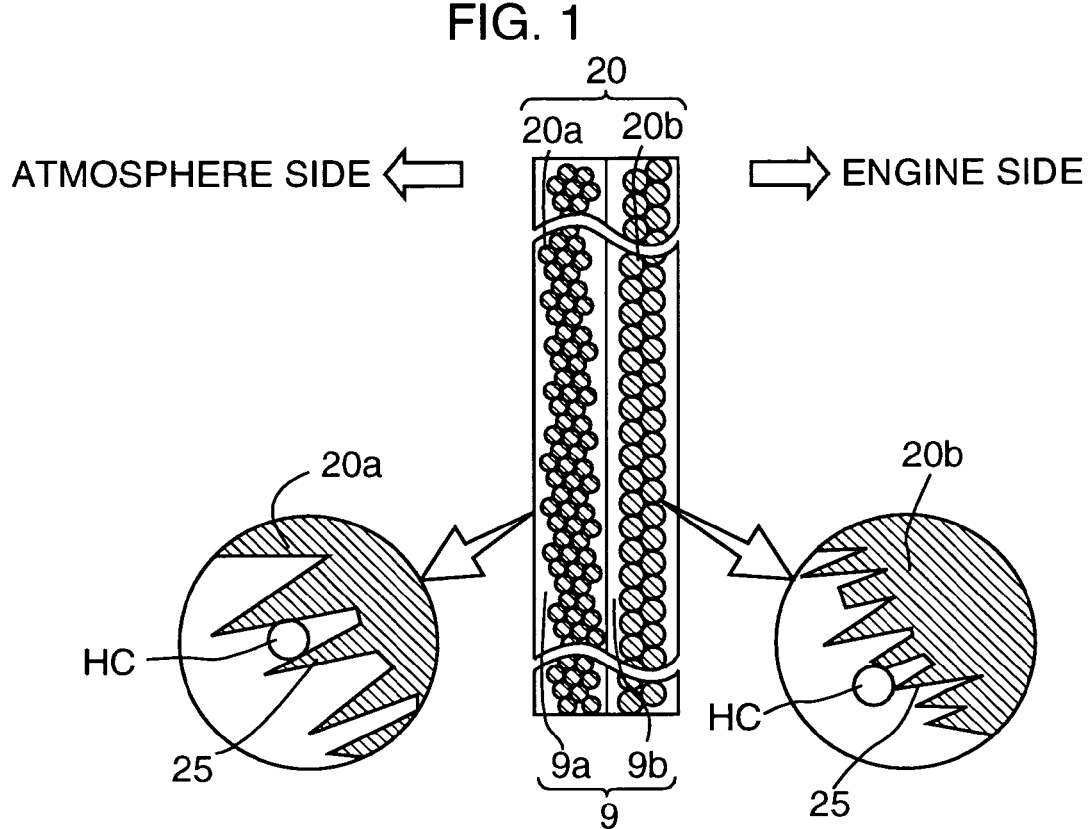
FIG. 1 is a cross-sectional view of a layer of activated carbon of an evaporated fuel adsorbing apparatus for an engine intake passage according to the present invention.

As illustrated in FIG. 1, the layer of activated carbon 9 includes a number of (or a plurality of) pellets (which can be particles or powder, and which can be cylindrical or spherical or of other shapes) of activated carbon 20 having a number of (or a plurality of) pores (concaves) 25. In the layer of activated carbon 9, at least one of a pellet size (an average pellet size) and a pore size (an average pore size) of the activated carbon in the layer 9 is varied in an intake gas flow direction D of the engine intake passage 12. The layer of activated carbon 9 includes an atmosphere side portion 9a of the layer 9 where a first portion 20a of the activated carbon 20 is located and an engine side portion 9b of the layer 9 where a second portion 20b of the activated carbon 20 is located. The first portion 20a of the activated carbon 20 and the second portion 20b of the activated carbon 20 are different from each other in at least one of the pellet size (average pellet size) and the pore size (average pore size) of the activated carbon.

Figure 2:
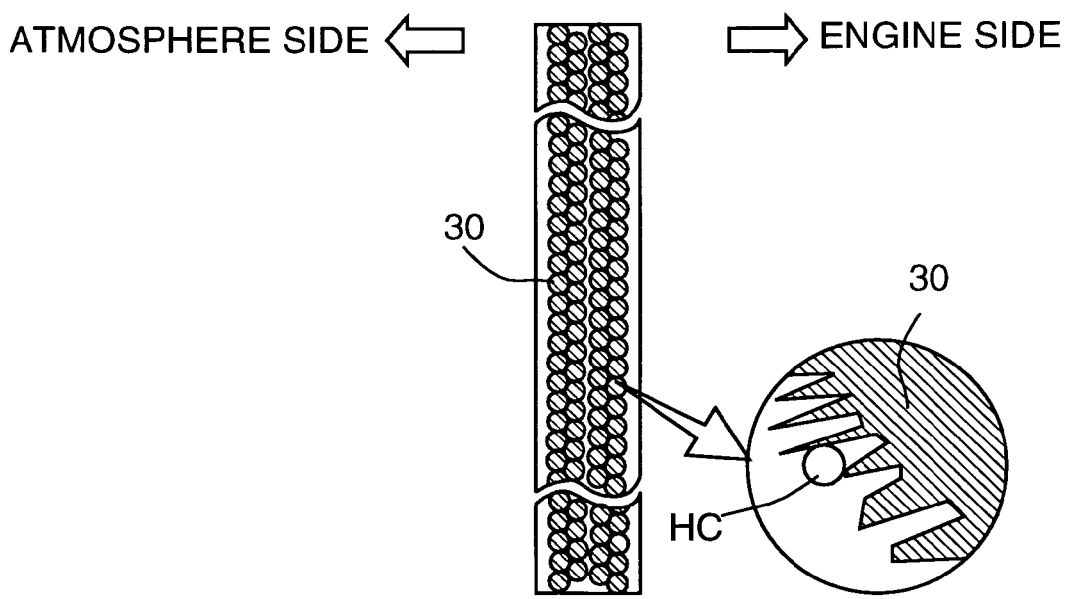
FIG. 2 is a cross-sectional view of a layer of activated carbon of a conventional evaporated fuel adsorbing apparatus for an engine intake passage.

Preferably, as illustrated in FIGS. 1 and 2, the average pore size of the first portion 20a of the activated carbon 20 is larger than an average size of a molecule (or a group of molecules sticking to each other) of large C-number hydrocarbons (e.g., the C-number exceeds eight) contained in the intake air from the atmosphere so that the pores of the first portion 20a of the activated carbon 20 can receive or accommodate the large C-number hydrocarbons therein. The average pore size of the first portion 20a of the activated carbon 20 is larger than an average pore size (a standard pore size) of a conventional activated carbon 30 where the large C-number hydrocarbons engage the inlets of the pores and block the pores.

Preferably, as illustrated in FIGS. 1 and 2, the average pore size of the second portion 20b of the activated carbon 20 is smaller than the average size of the molecule (or the group of molecules sticking to each other) of the large C-number hydrocarbons (e.g., the C-number exceeds eight) contained in the intake air from the atmosphere so that the pores of the second portion 20b of the activated carbon 20 cannot receive or accommodate the large C-number hydrocarbons therein, which therefore will be easily purged by purge air when purged. The average pore size of the second portion 20b of the activated carbon 20 is smaller than the average pore size (the standard pore size) of the conventional activated carbon 30 where the large C-number hydrocarbons engage the inlets of the pores and block the pores. The average pore size of the second portion 20b of the activated carbon 20 is larger than an average size of a molecule (or a group of molecules sticking to each other) of small C-number hydrocarbons (e.g., the C-number equal to or less than eight) contained in the intake gas floating from an engine side to the layer of activated carbon 9 when an engine stops, so that the pores of the second portion 20b of the activated carbon 20 can receive or accommodate the small C-number hydrocarbons therein thereby catching them.

Preferably, as illustrated in FIGS. 1 and 2, the average pellet size of the first portion 20a of the activated carbon 20 is equal to or smaller than an average pellet size of (a standard pellet size) of the conventional activated carbon 30. The average pellet size of the second portion 20b of the activated carbon 20 is larger than the average pellet size (the standard pellet size) of the conventional activated carbon 30.

The above structure where at least one of a pellet size and a pore size of the activated carbon is varied can be any one of the following three structures (i)–(iii):

(i) A pore size (an average pore size) of the first portion 20a of the activated carbon 20 located in an atmosphere side portion (layer portion) 9a of the layer 9 is greater than a pore size (an average pore size) of a second portion 20b of the activated carbon 20 located in an engine side portion (layer portion) 9b of the layer 9.

(ii) A pellet size (an average pellet size) of the first portion 20a of the activated carbon 20 located in an atmosphere side portion (layer portion) 9a of the layer 9 is smaller than a pellet size (an average pellet size) of a second portion 20b of the activated carbon 20 located in an engine side portion 9b of the layer 9.

(iii) A pore size (an average pore size) of the first portion 20a of the activated carbon 20 located in an atmosphere side portion (layer portion) 9a of the layer 9 is greater than a pore size (an average pore size) of a second portion 20b of the activated carbon 20 located in an engine side portion (layer portion) 9b of the layer 9, and a pellet size (an average pellet size) of the first portion 20a of the activated carbon 20 located in an atmosphere side portion (layer portion) 9a of the layer 9 is smaller than a pellet size (an average pellet size) of a second portion 20b of the activated carbon 20 located in an engine side portion 9b of the layer 9.

Effects and advantages due to the structure where at least one of an pellet size and a pore size of the activated carbon is varied are as follows:

In the case of item (iii) above (e.g., the case of FIG. 1), since the pellet size of the first portion 20a of the activated carbon 20 located in the atmosphere side portion 9a of the layer 9 is smaller than the pellet size of the second portion 20b of the activated carbon 20 located in the engine side portion 9b of the layer 9, clearances between pellets of the first portion 20a of the activated carbon 20 are small. As a result, a very small amount of hydrocarbons (for example, hydrocarbons exhausted from a vehicle running in front of an instant vehicle) contained in a large amount of intake air from the atmosphere is unlikely to pass through the clearances without being caught by the pellets of the first portion 20a of the activated carbon 20. The same can be said with the case of item (ii) above.

Further, in the case of item (iii) above (e.g., the case of FIG. 1), since the pore size of the first portion 20a of the activated carbon 20 located in the atmosphere side portion 9a of the layer 9 is greater than the pore size of the second portion 20b of the activated carbon 20 located in the engine side portion 9b of the layer 9, almost all portions of the large C-number hydrocarbons (e.g., the C-number exceeds eight) contained in the intake air from the atmosphere are selectively caught in the pores of the first portion 20a of the activated carbon 20, and are unlikely to flow to the second portion 20b of the activated carbon 20 having the smaller pore size located in the engine side portion 9b of the layer 9. If the large C-number hydrocarbons reach the second portion 20b of the activated carbon 20 having the smaller pore size located in the engine side portion 9b of the layer 9, the pores having the small average size of the second portion 20b of the activated carbon 20 will be blocked at the outlets of the pores and will not operate to catch hydrocarbons so that the second portion 20b of the activated carbon 20 will be in a degraded state. However, in the present invention, since the large C-number hydrocarbons do not reach the second portion 20b of the activated carbon 20, the second portion 20b of the activated carbon 20 will not be degraded. As a result, the second portion 20b of the activated carbon 20 will be kept in an effective state (non-degraded state) at an entire plane thereof for a long period of time. The same can be said with the case of item (i) above.

Contrarily, in the conventional evaporated fuel adsorbing member 30 which has a constant average pellet size and a constant average pore size at all portions of a layer of activated carbon, the large C-number hydrocarbons will be accumulated at all portions of the layer of activated carbon. The layer of activated carbon will be degraded at all portions thereof, resulting in an intolerable degradation.

Further, in the case of item (iii) above (e.g., the case of FIG. 1), as to adsorption of the hydrocarbons (i.e., small C-number hydrocarbons) from the engine side, despite that the second portion 20b of the activated carbon 20 in the engine side portion 9b of the layer 9 has a large pellet size and therefore a low layer-filling efficiency, the second portion 20b of the activated carbon 20 can adsorb the small C-number hydrocarbons from the engine side, because the flow speed of the gas including the hydrocarbons from the engine side after stopping of operation of the engine is very low. The same can be said with the case of item (ii) above.

Further, in the case of item (iii) above (e.g., the case of FIG. 1), as to adsorption of the hydrocarbons from the engine side, which are limited to small C-number hydrocarbons, more particularly, hydrocarbons of C-number equal to or less than eight, the second portion 20b of the activated carbon 20 can reliably adsorb the small C-number hydrocarbons from the engine side, by constructing the second portion 20b of the activated carbon 20 from activated carbon having a small average pore size. Furthermore, because the second portion 20b of the activated carbon 20 has a relatively large clearance between activated carbon pellets, purging of adsorbed hydrocarbons by air can be effectively performed. The same can be said with the case of item (i) above.

FIGS. 4A, 4B, 5, 6A, 6B, 7, 8A and 8B illustrate a plurality of embodiments of the invention wherein the layer of activated carbon 9 are formed in two layers, and comparisons therewith of conventional arrangements are discussed.

First Embodiment of the Invention

Figure 4A:
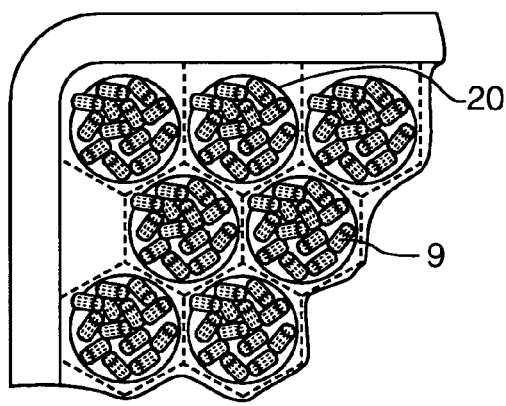
FIG. 4A is a plan view of a portion of a layer of activated carbon according to an evaporated fuel adsorbing apparatus for an engine intake passage according to a first embodiment of the present invention.
Figure 4B:
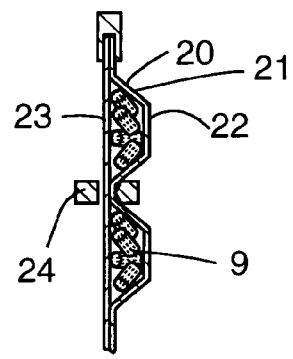
FIG. 4B is a cross-sectional view of the portion of the layer of activated carbon of FIG. 4A.
Figure 5:
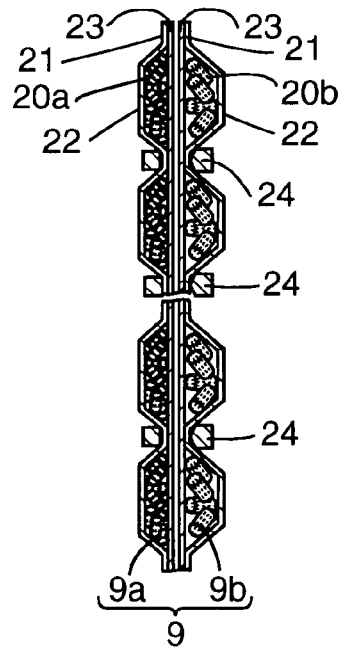
FIG. 5 is a cross-sectional view of a layered structure including a first layer and a second layer which have a structure similar to the layer of FIG. 4B but are different from each other in pellet size and pore size.

FIGS. 4A and 4B illustrate an embossed layer of activated carbon 9 according to a first embodiment of the invention. The layer of activated carbon 9 includes a first fabric 21 (for example, nonwoven fabric) having a plurality of (a number of) concaves 22 formed (embossed) therein, pellets of activated carbon 20 inserted in the plurality of concaves 22 of the first nonwoven fabric 21, and a second fabric 23 (for example, nonwoven fabric) layered and fixed to the first nonwoven fabric 21 from an open side of the plurality of concaves 22 so that the concaves 22 are closed by the second nonwoven fabric 23. As illustrated in FIG. 5, two layers 9a and 9b which have activated carbon of pellet sizes and pore sizes different from each other are layered to each other and are hot-pressed to each other thereby forming the layer of activated carbon 9.

Figure 7:
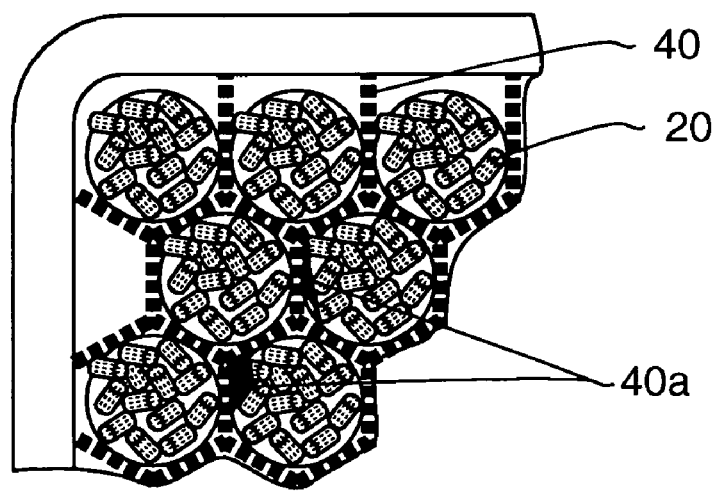
FIG. 7 is a plan view of a portion of the conventional evaporated fuel adsorbing apparatus.

Fixing of the first nonwoven fabric 21 and the second nonwoven fabric 23 is performed by hot-pressing as illustrated in FIG. 4B where hot-pressed portions are denoted with reference numeral 24. Due to the hot-press fixing, the fixing between the first nonwoven fabric 21 and the second nonwoven fabric 23 is performed without using an adhesive. As a result, there is no decrease in a hydrocarbon adsorption ability due to blockage of pores by an adhesive which, by contrast, occurs in the conventional layer of activated carbon as shown in FIG. 7, where flow 40a shows a flow of adhesive 40. Further, a pressure loss at the layer of activated carbon 9 will be decreased. Furthermore, a hot-press line can be provided more tightly in a plane of the layer than an adhesive line, so that an increase in strength of the layer can be expected.

The above fixing due to hot-press may be replaced by fixing due to sewing the first and second fabrics together using a thread. Further, the above fixing due to hot-press may be replaced by combination of fixing due to hot-press and fixing due to sewing using a thread, whereby a further increase in strength of the layer can be expected.

With technical advantages according to the evaporated fuel adsorbing apparatus according to the first embodiment of the invention, since the layer of activated carbon has embossed portions formed in the first nonwoven fabric, pellets of activated carbon 20 can be uniformly distributed and held over the entire plane of the layer, even in the case of the large-size pellets of activated carbon 20 as illustrated in FIG. 5.

Further, when the layer of activated carbon 9 having two layer portions 9a and 9b is manufactured, as illustrated in FIG. 5, the layer 9 can be manufactured by only layering two layer portions 9a and 9b, wherein at least one of an average pellet size and an average pore size of layer portion 9a is different from that of layer 9b, so that the manufacture is easy and simple.

Figure 6A:
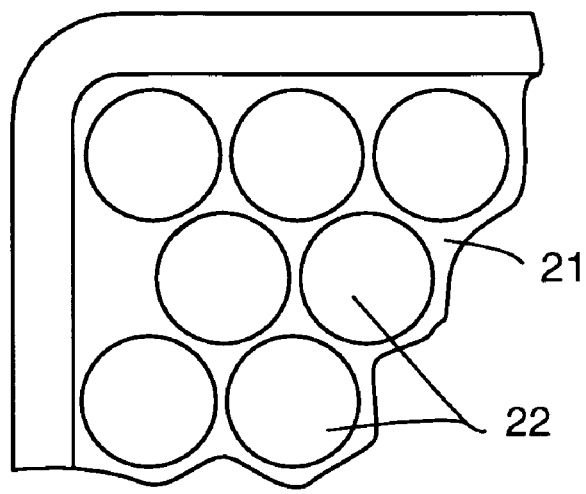
FIG. 6A is a plan view of a first nonwoven fabric having concave portions embossed, of the layer of the activated carbon of FIG. 4A.
Figure 6B:
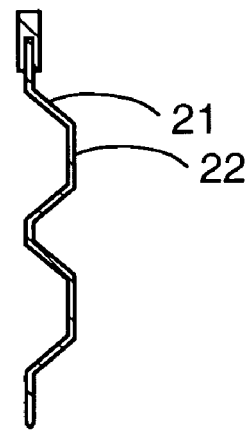
FIG. 6B is a cross-sectional view of the fabric of FIG. 6A.

Further, since forming all of the plurality of concave portions in the nonwoven fabric 21 illustrated in FIGS. 6A and 6B can be performed using a press machine at one time, the forming of the concave portions is easy and simple.

Second Embodiment of the Invention

Figure 8A:
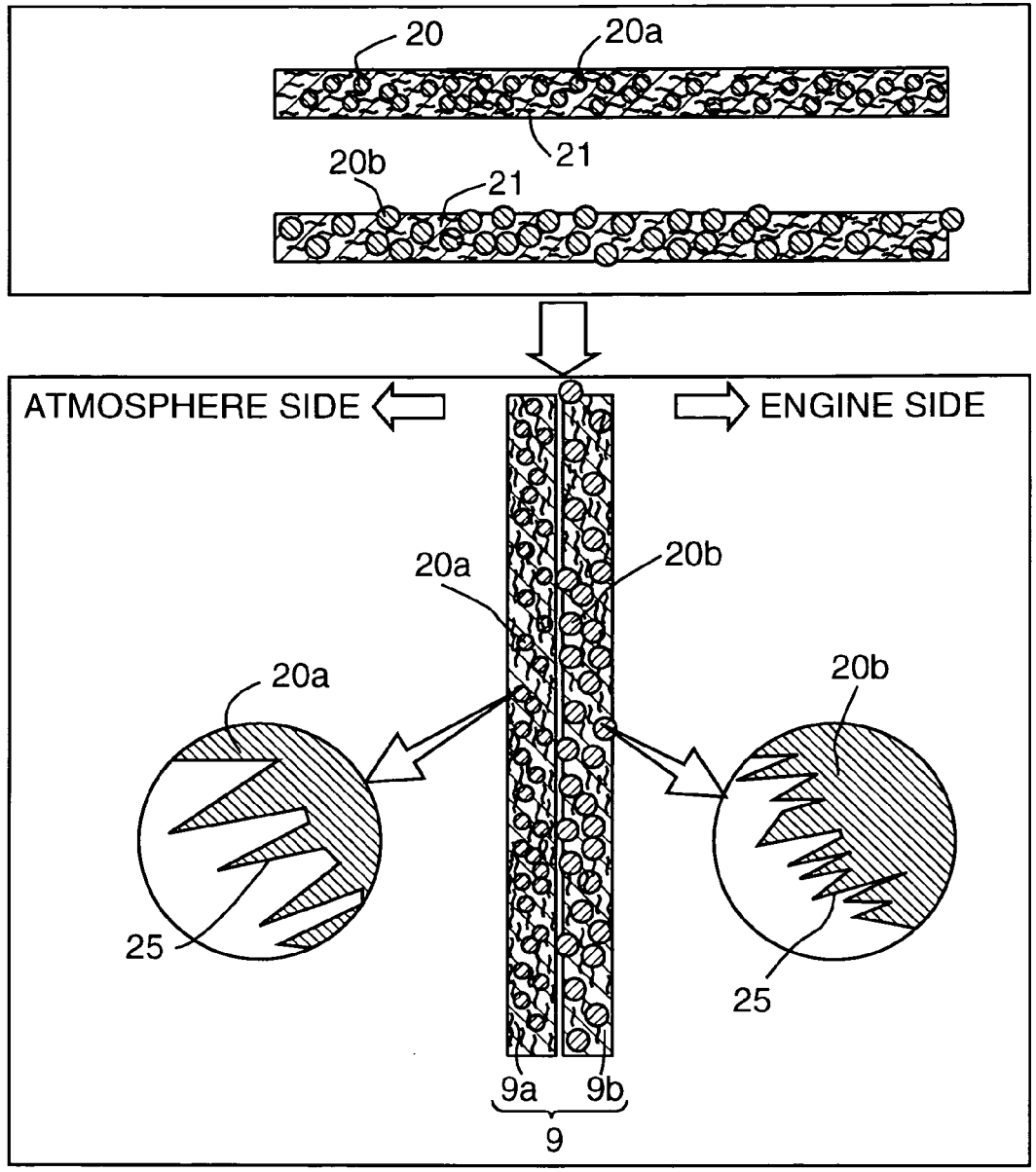
FIG. 8A is a cross-sectional view of a portion of an evaporated fuel adsorbing activated-carbon layer of a composite-type according to an evaporated fuel adsorbing apparatus for an engine intake passage, in states before assembly and after assembly, according to a first example of a second embodiment of the present invention.
Figure 8B:
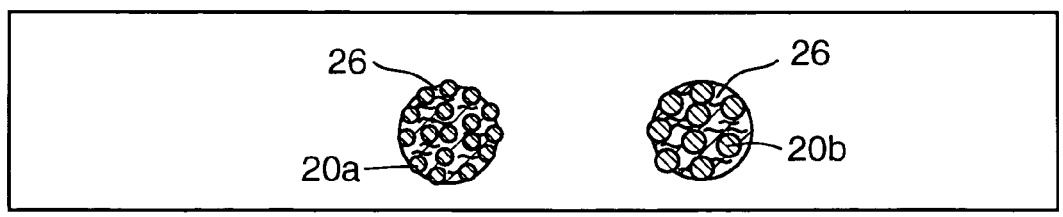
FIG. 8B is a cross-sectional view of threads of another evaporated fuel adsorbing activated-carbon layer of a composite-type according to a second example of the second embodiment of the present invention.

FIGS. 8A and 8B illustrate the layer of activated carbon 9 according to a second embodiment of the invention. The layer of activated carbon 9 includes an activated carbon composite material formed by mixing an adsorbing material (for example, activated carbon 20) with another material (for example, nonwoven fabric) that is initially in liquid form and subsequently solidifies.

More particularly, when the composite material is formed, the activated carbon is broken into powder and is mixed into a material in a liquid state so that when the material in the liquid state later hardens, a composite material is formed. By changing the material characteristics of the activated carbon mixed into the liquid material, a carbon composite material having aimed-for adsorbing characteristics can be manufactured.

Any way of a manufacturing the example of FIG. 8A or of FIG. 8B may be used. In the manufacture of the example of FIG. 8A, the activated carbon powder and a mixing material form a sheet of composite material. In the manufacture of FIG. 8B, the activated carbon powder 20a, 20b is mixed into a thread 26 and then the thread 26 containing the activated carbon powder 20a, 20b is sewn into a sheet of nonwoven fabric.

With technical advantages according to the evaporated fuel adsorbing apparatus according to the second embodiment of the invention, since the activated carbon to be composite can be changed in the characteristics (pellet size, pore size), layer portions 9a, 9b having different characteristics from each other can be easily manufactured. By changing at least one of the pellet size and the pore size of the composite activate carbon between the first, atmosphere-side portion of the layer and the second, engine-side portion of the layer, similar advantages to those described with reference to FIGS. 4–6 can be obtained.

Third Embodiment of the Invention

In a third embodiment of the invention, the layer of activated carbon 9 includes a nonwoven fabric with the activated carbon 20 sewn therein.

Sewing the activated carbon into the nonwoven fabric can be performed by any one of the following methods (a) and (b):

(a) The method includes the steps of inserting the activated carbon 20 between two nonwoven fabric sheets and sewing the two nonwoven fabrics to each other. In this method, no embossed concaves are formed in any of the two nonwoven fabrics, unlike the first embodiment of the present invention.

(b) The method includes the steps of manufacturing two or more nonwoven fabrics from activated carbon fibers (e.g., carbon fibers) by changing the pore sizes of the activated carbon from each other and layering and sewing or hot-pressing the two nonwoven fabrics to each other. In this method, the fibers of the nonwoven fabrics are made from carbon, unlike the case of FIG. 8B.

Technical advantages according to the evaporated fuel adsorbing apparatus according to the third embodiment of the invention are the same as those of the evaporated fuel adsorbing apparatus according to the first embodiment of the present invention.

Although the present invention has been described above with reference to specific exemplary embodiments, it will be appreciated by those skilled in the art that various modifications and alterations can be made to the particular embodiments shown without materially departing from the novel teachings and advantages of the present invention. Accordingly, it is to be understood that all such modifications and alterations are included within the spirit and scope of the present invention as defined by the following claims.

What is claimed is:

1. An evaporated fuel adsorbing apparatus for an engine intake passage comprising:

a layer of activated carbon disposed in the engine intake passage for adsorbing evaporated fuel, said activated carbon including activated carbon pellets having pores, wherein both of an average pellet size and an average pore size of said activated carbon are varied in an intake gas flow direction of said engine intake passage.

2. An evaporated fuel adsorbing apparatus according to claim 1, wherein an average pore size of a first portion of said activated carbon located in an atmosphere side portion of said layer is greater than an average pore size of a second portion of said activated carbon located in an engine side portion of said layer.

3. An evaporated fuel adsorbing apparatus according to claim 1, wherein an average pellet size of a first portion of said activated carbon located in an atmosphere side portion of said layer is smaller than an average pellet size of a second portion of said activated carbon located in an engine side portion of said layer.

4. An evaporated fuel adsorbing apparatus according to claim 1, wherein an average pore size of a first portion of said activated carbon located in an atmosphere side portion of said layer is greater than an average pore size of a second portion of said activated carbon located in an engine side of said layer, and an average pellet size of said first portion of said activated carbon located in said atmosphere side portion of said layer is smaller than an average pellet size of said second portion of said activated carbon located in said engine side portion of said layer.

5. An evaporated fuel adsorbing apparatus according to claim 1, wherein said layer of activated carbon includes:

a first fabric having a plurality of concaves formed therein;

pellets of activated carbon inserted in said plurality of concaves of said first fabric; and a second fabric layered to said first fabric from an open side of said plurality of concaves.

6. An evaporated fuel adsorbing apparatus according to claim 1, wherein said layer of activated carbon includes an activated carbon composite material.

7. An evaporated fuel adsorbing apparatus according to claim 1, wherein said layer of activated carbon includes a fabric sewing said activated carbon therein.

* * * * *